Oct. 27, 1931.　　A. W. VAN BERKEL　　1,829,316
WEIGHING APPARATUS
Filed Oct. 30, 1929　　2 Sheets-Sheet 1

Inventor:
Adrianus W. van Berkel
Chas. M. Nissen
BY
Atty.

Oct. 27, 1931.  A. W. VAN BERKEL  1,829,316
WEIGHING APPARATUS
Filed Oct. 30, 1929     2 Sheets-Sheet 2

Inventor:
Adrianus W. van Berkel
Chas. M. Nissen
BY
Atty.

Patented Oct. 27, 1931

1,829,316

UNITED STATES PATENT OFFICE

ADRIANUS WILHELMUS VAN BERKEL, OF ROTTERDAM, NETHERLANDS, ASSIGNOR TO NAAMLOOZE VENNOOTSCHAP MAATSCHAPPIJ TOT VERVAARDIGING VAN SNIJMACHINES VOLGENS VAN BERKEL'S PATENT EN VAN ANDERE WERKTUIGEN, OF ROTTERDAM, NETHERLANDS, A LIMITED LIABILITY COMPANY OF THE NETHERLANDS

WEIGHING APPARATUS

Application filed October 30, 1929, Serial No. 403,407, and in Great Britain November 2, 1928.

The present invention relates to weighing apparatus of the type which is provided with a means for mechanically increasing and decreasing the weighing capacity thereof. In such weighing apparatus, a manual means is provided for mechanically increasing and decreasing the weighing capacity of the weighing apparatus within the accepted range of the capacity of said apparatus.

One object of the present invention is to provide improved apparatus of this nature which is designed to more effectively prevent the perpetration of fraud or fraudulent practice in the use of such weighing apparatus.

Another object of this invention is the provision of means for enclosing the means for mechanically increasing and decreasing the weighing capacity of the apparatus within a casing which is at least partially transparent in order to enable one to see the means for mechanically increasing and decreasing the weighing capacity to thereby enable one to determine whether or not the weighing apparatus is being properly manipulated. In this device, a means is provided exteriorly of the casing for operating the means for mechanically increasing and decreasing the weighing capacity and this operating means also serves as a means to indicate any change in the capacity of the weighing apparatus.

Another object of this invention is the provision of a plurality of weights which are to be placed upon the weight platform supported on one end of a weigh-beam and these weights are, according to the present invention, enclosed in a suitable casing which enables one to see the weights in the interior thereof. While I have disclosed a plurality of weights for increasing the weighing capacity of the weighing apparatus, it is possible to use but a single weight or it may be possible to use other means for mechanically increasing and decreasing the weighing capacity of the weighing apparatus without departing from the scope of this invention.

Another object of this invention is to provide a supporting means for each of the weights which comprises a rod or rods for each of the weights, extending through the casing which encloses the weights and is operatively connected by suitable means to a lever which is to be used for operating said weights to raise or lower the same onto the weight platform mounted on the weigh-beam.

Another object of this invention is to provide each of the operating levers for the weights with suitable indicia so that when each of the weights is lowered onto the weight platform, the lever will be presented in a vertical position and will indicate to the customer by means of said indicia the total amount of the weight, or weights, on the weight platform.

A still further object of the invention is the provision of means for guiding the weights as they are moved onto and off of the weight platform so that said weights are always maintained in their proper spaced relation.

The final object of the invention is the provision of a casing which partially encloses the rods which support the weights and the means for operating the rods.

In the drawings:—

Figure 1:
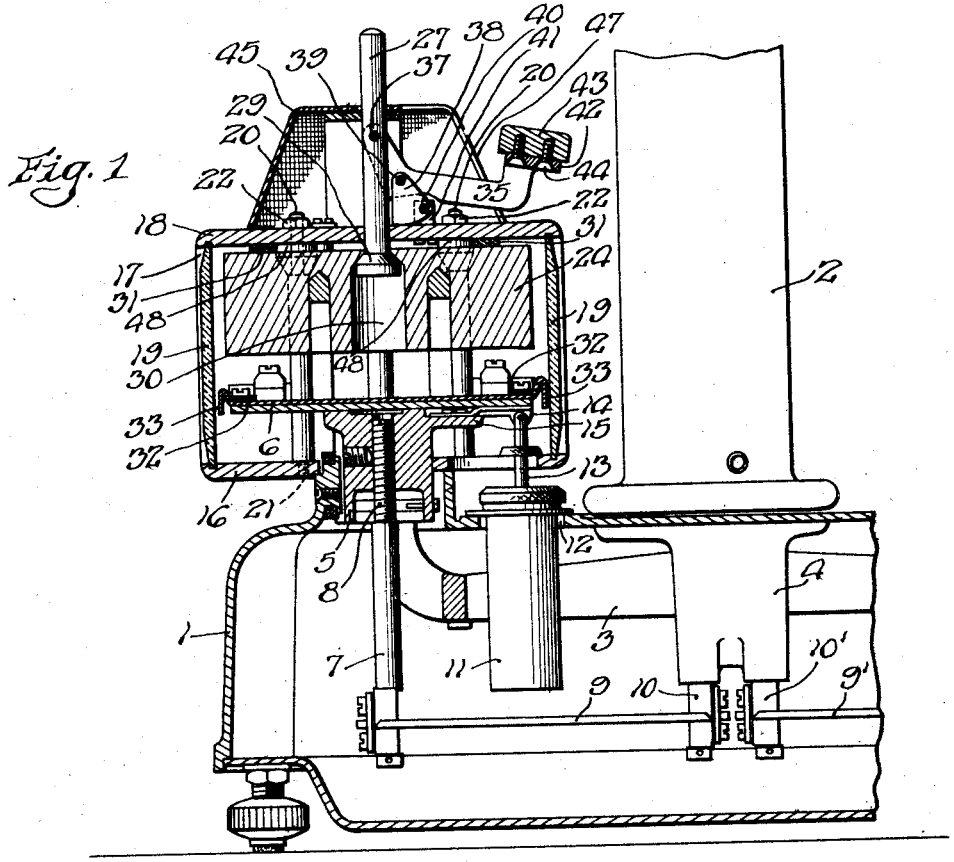
Fig. 1 is an elevational view partly in cross-section of a device embodying my invention.

Referring more particularly to Fig. 1, it will be noted that the casing 1 has an upstanding housing member 2 supported thereon, said housing member being adapted to enclose the usual indicating scale for the weighing apparatus and the means which connects the indicating means to the weigh-beam 3 pivotally supported within the bracket 4 by suitable knife edges (not shown). One end of the weigh-beam 3 is operatively connected to the supporting member 5 for the weight platform 6. The other end of the weigh-beam 3 supports a member similar to the member 5 and a platform similar to the platform 6. This platform supported at the other end of the weigh-beam 3 is not shown but is of a well-known construction and is adapted to support the object to be weighed. The indicating means within the housing 2 is adapted to indicate the weights within a certain range, as, for instance, weights up to and including one kilogram. However, if it becomes necessary at times to use such a weighing apparatus for objects over one kilogram in weight and, therefore, it is necessary to increase the weighing capacity of the weighing apparatus, this is accomplished usually by adding additional weights to the platform 6, such weights usually being in multiples of the normal weighing capacity indicated by the indicating means within the housing 2. The supporting member 5 has a rod 7 rigidly fastened thereto by the screw-threaded connection 8 and this rod 7 is connected by means of the parallel motion arm 9 to the member 10 fixed to the bracket 4. A similar parallel motion arm 9' is connected to a member 10' fixed to the bracket 4 and also to the load platform, not shown. This mechanism is for the purpose of causing the load and weight platforms to move through successive parallel positions as the weigh-beam 3 is rocked about its pivot.

A dash pot 11 is mounted within a suitable recess 12 in the casing 1 and is operatively connected by a piston rod 13 to a bracket 14 fastened to a lug 15 on the supporting member 5. The piston rod 13 carries a suitable piston which operates within the dash pot 11 and acts to check the movements of the weight platform 6. The weight platform 6 is enclosed within a suitable casing comprising the member 16 having side walls 17, a removable top 18, and a plurality of transparent members 19, preferably made of glass. The casing prevents dust and dirt from accumulating within said casing and on the operating parts therein. Suitable bolts 20 extend through the top 18 and the weight platform 6 and are screw-threaded, as at 21, in the member 16; and nuts 22 are screw-threaded on the upper ends of the bolts 20 to hold the various parts of the casing together in the position shown.

A plurality of weights 23, 24 and 25 are normally suspended within the casing by means of the rods 26, 27 and 28 extending through the member 18 of the casing and provided at their lower ends with enlarged heads such as the head 29 shown on the rod 27 in Fig. 1. The enlarged head 29 is provided with a conical upper face adapted to engage a similar conical face extending downwardly within the recess 30 of the weight 24. Thus it will be seen that if the rods 26, 27 or 28 are moved vertically upward, the weights 23, 24 and 25 will be moved in a corresponding direction and be carried adjacent the upper interior surface of the casing, as best illustrated in Fig. 1. If the rods are lowered, the weights are permitted to rest on the platform 6 and the enlarged heads on the lower ends of these rods will be thrown out of engagement with the conical surfaces at the upper end of the recesses within each of the weights. Suitable buffer strips 31 and 32 located on the inner upper surface of the casing and the weight platform, respectively, act as suitable means for cushioning the movements of the weights if and when they are moved toward the weight platform and toward the top of the casing with a sudden movement. Suitable flexible strips 33 surround the weight platform 6 and act as suitable buffers between the weight platform and the sides of the casing.

In order to move the rods 26, 27 and 28 vertically, I provide levers 34, 35 and 36, each of which is operatively connected to its respective rod by suitable pivots. Since the manner in which the levers 34, 35, and 36 are connected to their respective rods is identical, the description of the manner in which the lever 35, shown in Fig. 1, is connected to the rod 27, will answer for a description of the operative connections between each of the levers and their respective rods. The lever 35 is pivoted at 37 to the rod 27 and a substantially triangular member 38 is pivoted at 39 to the lever 35 intermediate its ends, as best illustrated in Fig. 1. This triangular member 38 is also pivoted at 40 to a lug 41 rigid with the member 18. It will be noted from an inspection of Fig. 1 that the three pivotal points 37, 39 and 40 are so arranged that the pivotal connection 39 is located slightly to the left of a line drawn through the pivotal connections 37 and 40 so that the downward force exerted on the rod 27 by the weight 24 holds the member 38 against the top of the casing and prevents the downward movement of the rod 27.

Figure 3:
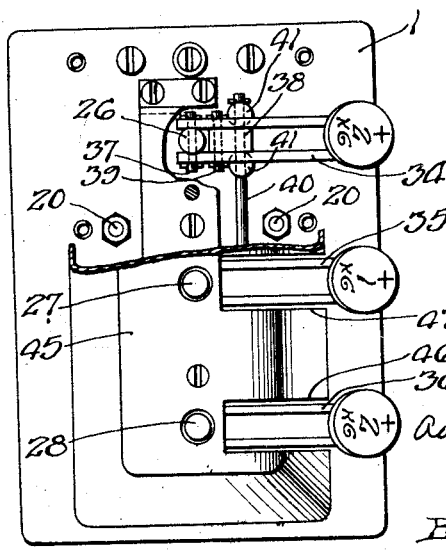
Fig. 3 is a plan view thereof.
Figure 2:
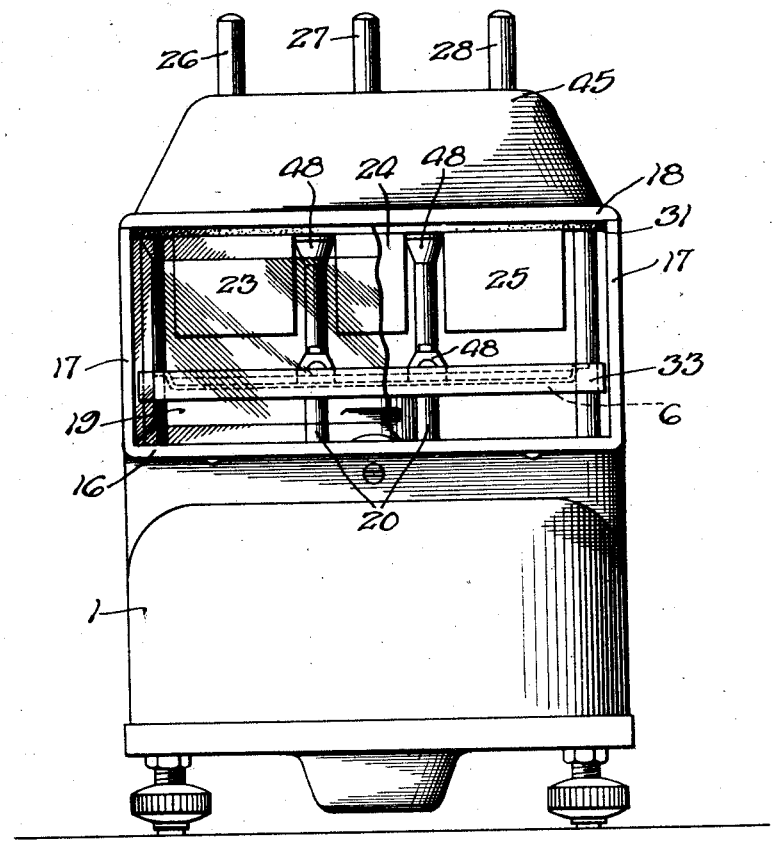
Fig. 2 is an end elevational view of the device shown in Fig. 1.

As will be noted by an inspection of Figs. 1 and 3, the operating lever 35 comprises a pair of spaced arms connected by means of a cross bar 42 and a suitable key 43 is fastened thereto by means of the screws 44. Each of these keys carry suitable indicia, such as is illustrated in Fig. 3, for indicating the weight supported by each of the rods 26, 27 and 28. When it is desired to lower a weight, or weights, onto the platform 6, the key 43 is grasped and moved upwardly. This causes the triangular member 38 to rock about the pivot 40 and thus throw the pivot 39 to the right of a line drawn between the pivots 37 and 40, enabling the rod 27 to move downwardly under the influence of the force exerted by the weight 24. The rod 27 is permitted to have a movement in excess of the movement permitted for the weight 24 so that when the weight 24 is deposited upon the weight platform 6, the enlarged head 29 will have its conical surface out of engagement with the weight 24, and the weight 24 will rest freely on the weight platform 6. When any of the weights are deposited upon the weight platform 6, the operating lever therefor will extend in a substantially vertically position and the indicia on said vertically extending lever will indicate the weight deposited upon the weigh-beam so that there can be no doubt as to the capacity of the weighing apparatus and, therefore, no misrepresentation as to the weight of the article being weighed, the transparent members 19 serving as a means to enable one to tell whether or not the weight has actually been deposited on the weight platform.

The operating mechanism for raising and lowering the weights is partially enclosed within the housing 45 supported on the upper end of the casing comprising the members 16, 17, 18 and 19, to prevent dust and dirt from accumulating thereon. The operating levers 34, 35 and 36 extend through suitable slots such as the slots 46 and 47, shown for the levers 36 and 35, respectively. The rods 20 have enlarged ends 48 and these rods serve the purpose of maintaining the weights in proper alinement and guide said weights as they are moved from one position to the other.

The operation of this device is as follows:—

In the event that the capacity of the weighing apparatus is greater than normally intended, the desired number of weights are deposited upon the weight platform 6 to increase the capacity of the weighing apparatus the desired amount, the levers 34, 35 and 36 being used to actuate the weights. The total weight of the weights deposited upon the weight platform 6 can readily be determined by adding up the weights indicated on the indicia mounted on the levers which are in a substantially vertical position. In other words, if the levers 35 and 36 were in a substantially vertical position, the total weight of the weights on the weight platform would be 2 kg. plus 1 kg., or a total of 3 kg. The dash pot 11 prevents any sudden movement of the weight platform 6 as well as the movement of the weigh-beam 3 and the parallel motion arms 9 and 9' guide the weight platform and load platform through successive parallel planes.

Obviously, those skilled in the art may make various changes in the details and arrangement of parts without departing from the spirit and scope of the invention as defined by the claims hereto appended; I, therefore, do not wish to be restricted to the precise construction herein disclosed.

Having thus fully disclosed an embodiment of my invention, what I claim and desire to secure by Letters Patent of the United States is:—

1. A weighing apparatus comprising a weight platform operatively connected to the weighing mechanism of said weighing apparatus, a plurality of weights, a casing enclosing said weight platform and weights, said weights being suspended within said casing by rods extending through said casing, said rods having means connected thereto for holding them in such a position that the weights suspended thereon can be selectively arranged in positions in which the weights will rest on said platform or will be totally out of engagement therewith.

2. A device as claimed in claim 1 in which the means for operating the rods comprise pivoted levers operatively connected to said rods and casing and provided with suitable locking means for locking said levers in such positions that the weights may occupy the positions indicated.

3. A weighing apparatus comprising a weigh-beam, a weight platform operatively connected thereto, a plurality of weights normally suspended above said weight platform, pivoted levers adapted to selectively occupy substantially horizontal positions and substantially vertical positions, indicating means on said levers for indicating the value of the weights operated thereby, said indicating means being adapted to indicate the value of the weights on said weight platform when arranged in their substantially vertical positions.

4. In a weighing apparatus, the combination with a weigh-beam, of a weight platform operatively connected thereto, a weight adapted to be arranged in position on said weight platform and also off of said weight platform, and means for guiding said weight as it is moved onto and off of said weight platform comprising a plurality of spaced rods adapted to engage the sides of said weight.

5. In a weighing apparatus, the combination of means for mechanically increasing and decreasing the weighing capacity of said weighing apparatus comprising a plurality of weights adapted to be moved onto and off of a weight platform operatively connected to the load platform of a weighing apparatus, of means for guiding said weights onto and off of said weight platform comprising a plurality of spaced rods adapted to engage said weights.

6. A weighing apparatus comprising a weight platform operatively connected to the weighing mechanism of said weighing apparatus, a casing substantially enclosing said weight platform, a plurality of weights within said casing adapted to be moved onto and off of said weight platform, operating means mounted exteriorly of said casing and adapted to move said weights onto and off of said weight platform, a housing partially enclosing said last-mentioned means and provided with suitable openings through which said last-mentioned means is adapted to extend, and means for guiding said weights as they are moved onto and off of said weight platform, said casing being partially transparent.

7. A weighing apparatus such as claimed in claim 6 in which said operating means comprises a plurality of levers pivoted to rods adapted to extend into said casing and support said weights, said pivoted levers having means thereon adapted to indicate the value of the weights on said weight platform when said levers are arranged in a substantially vertical position.

8. A weighing apparatus comprising a weight platform operatively connected to the weigh-beam of a weighing apparatus, a plurality of weights, means for moving said weights onto and off of said weight platform, said last-mentioned means comprising a plurality of operating levers each of which is adapted to be connected to a selected one of said weights by means of a rod pivoted thereto, links pivoted to said levers, said links being also pivoted to fixed supports, the force exerted by said weights on said rods being transmitted to said pivotal connections between said levers and said links, said pivotal connections between said links and said levers being adapted to lie on opposite sides of a line through the pivotal connections between said levers and said rods and said pivotal connections between said links and said fixed supports, said links while lying along one side of said line being operable to prevent said weights from moving onto said weight platform and, when lying on the opposite side of said line, being adapted to permit movement of said weights onto said weight platform.

9. A device as claimed in claim 8 in which a transparent casing is provided for substantially enclosing said weight platform and said weights.

10. A device as claimed in claim 8 in which a transparent casing substantially encloses said weight platform and said weights, and in which a second casing is provided for substantially enclosing the operating means for said weights.

In testimony whereof I have signed my name to this specification on this 18th day of October, A. D. 1929.

ADRIANUS WILHELMUS van BERKEL.